United States Patent [19]

Ogawa et al.

[11] Patent Number: 4,664,981
[45] Date of Patent: May 12, 1987

[54] MAGNETIC RECORDING MEDIUM

[75] Inventors: Hiroshi Ogawa; Yasuo Tamai, both of Kanagawa, Japan

[73] Assignee: Fuji Photo Film Co., Ltd., Kanagawa, Japan

[21] Appl. No.: 692,807

[22] Filed: Jan. 18, 1985

[30] Foreign Application Priority Data

Jan. 19, 1984 [JP] Japan .................................. 59-7768

[51] Int. Cl.$^4$ .............................................. G11B 5/702
[52] U.S. Cl. ............................ 428/425.9; 252/62.54; 427/128; 428/694; 428/522; 428/521; 428/523; 428/900
[58] Field of Search ............... 428/695, 694, 421, 422, 428/900, 425.9, 522, 521, 523; 252/62.54; 427/128; 360/134–136

[56] References Cited

U.S. PATENT DOCUMENTS

| | | | |
|---|---|---|---|
| 4,352,859 | 10/1982 | Yoda | 428/694 |
| 4,388,376 | 6/1983 | Kubota | 428/425.9 |
| 4,465,737 | 8/1984 | Miyatuka | 428/695 |
| 4,496,626 | 1/1985 | Kasuga | 428/695 |
| 4,537,833 | 8/1985 | Kasuga | 428/694 |

Primary Examiner—Ellis P. Robinson
Attorney, Agent, or Firm—Sughrue, Mion, Zinn Macpeak & Seas

[57] ABSTRACT

A magnetic recording medium having excellent electromagnetic properties and satisfactory running durability prepared by mixing a highly concentrated solution of copolymers for vinyl chloride, vinyl acetate and maleic anhydride with ferromagnetic particles and kneading them, and then adding a solution of rubber type resins and additives thereto and dispersing them, and if desired, by adding and mixing polyisocyanate compounds therewith.

21 Claims, No Drawings

MAGNETIC RECORDING MEDIUM

FIELD OF THE INVENTION

The present invention relates to a magnetic recording medium, and more particularly it relates to a magnetic recording medium having excellent running properties and durability.

BACKGROUND OF THE INVENTION

Magnetic recording material, particularly an audio cassette tape has recently been used for recording music. As a result, the material must have a low harmonic distortion factor, excellent electromagnetic properties as well as excellent running properties and durability.

High density recording has been realized in a video cassette tape by shortening the recording wave length and narrowing the width of the tape. For high density recording, a tape must have high output, a high S/N ratio and excellent electromagnetic properties. The total thickness of the tape becomes very thin, for example 20 m or less, and a VTR tape must have far better running durability. That is, both audio cassette tapes and video cassette tapes must have much better electromagnetic properties, running properties and durabilities.

Various binder compositions have been proposed to meet the above requirements, but satisfactory binder composition has not yet been found.

Currently, a mixture of copolymers of vinyl chloride, vinyl acetate and other vinyl compounds with rubber type resins is mainly used as a binder composition in view of its dispersibility of ferromagnetic particles and running properties and durability of a magnetic layer. Copolymers of vinyl chloride, vinyl acetate and other vinyl compounds include compolymers of vinyl chloride, vinyl acetate and vinyl alcohol, and copolymers of vinyl chloride, vinyl acetate and maleic anhydride as described in, for example, U.S. Pat. Nos. 2,607,710, 2,885,365, 3,242,005, 3,247,017, 3,404,997, 3,597,273, 3,650,828, 4,238,548, 4,323,628, 4,340,644, 4,352,859, 4,388,376, 4,409,291, 4,409,299, 4,411,957 and 4,414,288. Copolymers of vinyl chloride, vinyl acetate and maleic anhydride are more frequently used because these copolymers are very effective for dispersing ferromagnetic particles.

However, a magnetic recording medium having excellent electromagnetic properties and satisfactory running durability cannot be obtained using copolymers of vinyl chloride, vinyl acetate and maleic anhydride.

U.S. Pat. No. 3,728,262 discloses a process in which ferromagnetic particles are treated with a diluted solution of copolymers of vinyl chloride, vinyl acetate and vinyl alcohol with stirring. However, this process does not give rise to a magnetic recording medium having excellent electromagnetic properties and satisfactory running durability.

SUMMARY OF THE INVENTION

A first object of the present invention is to provide a magnetic recording medium having excellent electromagnetic properties.

A second object of the present invention is to provide a magnetic recording medium having excellent running durability.

In this connection, extensive research has been made on various binder composition, dispersing methods and the order of addition of compositions and it has now been found that a magnetic recording medium having excellent electromagnetic properties and satisfactory running durability can be obtained by mixing a highly concentrated solution of copolymers of vinyl chloride, vinyl acetate and maleic anhydride with ferromagnetic particles and kneading them (first step), by adding a solution of rubber type resins and additives thereto and dispersing them (second step) and, if desired, by adding and mixing polyisocyanate compounds therewith (third step).

DETAILED DESCRIPTION OF THE INVENTION

The above objects can be attained in one embodiment by a magnetic recording medium prepared by mixing solution of copolymers of vinyl chloride, vinyl acetate and maleic anhydride containing 0.1 to 10 wt. % of maleic anhydride, the concentration of the solution being 15 wt. % or more, with ferromagnetic particles and kneading them in a first step, adding rubber type resins solution and additives thereto, dispersing and coating the resulting magnetic coating composition on a non-magnetic support in a second step.

The above object can be attained in another embodiment by a magnetic recording medium prepared by mixing solution of copolymers of vinyl chloride, vinyl acetate and maleic anhydride containing 0.1 to 10 wt. % maleic anhydride, the concentration of the solution being 15 wt. % or more, with ferromagnetic particles and kneading them in a first step, adding a solution of rubber type resins and additives thereto, dispersing them in a second step, mixing polyisocyanate compounds therewith and coating the resulting magnetic coating composition on a non-magnetic support in a third step.

The mixing ratio of copolymers of vinyl chloride, vinyl acetate and maleic anhydride containing maleic anhydride used in the first step of the present invention is 70 to 99 wt. %, preferably 80 to 95 wt. %, of vinyl chloride, 0.5 to 30 wt. %, preferably 0.5 to 20 wt. %, of vinyl acetate and 0.1 to 10 wt. %, preferably 0.5 to 5 wt. %, and most preferably 1 to 3 wt. % of maleic anhydride. The degree of polymerization is 200 to 600, preferably about 300 to 500, and the molecular weight distribution (MW/MN) is 1.0 to 3.0.

When the mixing ratio of maleic anhydride is about 0.1 wt. % or less, electromagnetic properties of the resulting magnetic recording medium are not improved. When it is about 10 wt. % or more, copolymerization becomes difficult and dissolution of the copolymers into a solvent is reduced.

When the degree of polymerization is 200 or less, satisfactory durability cannot be obtained. When it is 600 or more, dissolution of copolymers into a solvent is decreased.

The molecular weight distribution cannot theoretically be 1.0 or less. When it is 3.0 or more, sufficient durability cannot be obtained.

The highly concentrated solution of copolymers of vinyl chloride, vinyl acetate and maleic anhydride used in the present invention has a concentration of about 15 wt. % or more, preferably 20 wt. % or more, more preferably 30 wt. % to 50 wt. %.

Where concentration is lower than 15 wt. %, electromagnetic properties can hardly be improved.

Where concentration is higher than 50 wt. %, the viscosity of the solution becomes too high, and the solution becomes a gel state, which is difficult to handle.

Copolymers of vinyl chloride, vinyl acetate and maleic anhydrides are commercially available under the trade name of "Denkavinyl 1000C" manufactured by Denki Kagaku Kogyo K.K., "S-lec M" manufactured by Sekisui Chemical Co., Ltd., "MPR-TA" manufactured by Nisshin Chemical Industries, Ltd., and "VMCH" manufactured by Union Carbide Co.

Ferromagnetic particles used in the first step of the present invention include $\gamma\text{-Fe}_2\text{O}_3$, $\text{Fe}_3\text{O}_4$, Co-modified iron oxide, alloy particles mainly composed of iron, modified barium ferrite and modified strontium ferrite as described, for example, in U.S. Pat. Nos. 3,026,215, 3,031,341, 3,100,194, 3,242,005 and 3,389,014.

The shape of these ferromagnetic particles is acicular, granular, a dice shape, a rice grain shape and tabular.

The particle size of ferromagnetic particles is $1\mu$ or less, preferably $0.5\mu$ or less, and the specific surface area is 20 m$^2$/g to 200 m$^2$/g, preferably 20 m$^2$/g to 100 m$^2$/g.

The rubber type resins used in the second step of the present invention include resins such as a polyurethane rubber (a polyurethane resin), a styrene butadiene rubber, a butadiene rubber, an isoprene rubber, a chloroprene rubber, an isobutylene and isoprene rubber, an acrylonitrile butadiene rubber, a chlorinated butyl rubber, an acryl rubber, and an epichlorohydrin rubber. Of those rubber type resins, a polyurethane rubber (a polyurethane resin) is the most preferred.

A polyurethane rubber is commercially available in the trade name of "Desmocole 110", "Desmocole 130", "Desmocole 176", "Desmocole 400", "Desmocole 420" and "Desmocole 500" manufactured by Sumitomo Bayer Urethane Co., Ltd., "Nipporan 2301", "Nipporan 2304", "Nipporan 3022" and "Nipporan 3109" manufactured by Nippon Polyurethane Co., Ltd., "Pandex T-5201", "Pandex T-5205", "Pandex T-5265", "Crisvon 6109", "Crisvon 6407", "Crisvon 6208", "Crisvon 7309", "Crisvon 7319", "Crisvon 7209" and "Crisvon 4216" manufactured by Dai-Nippon Ink & Chemicals, Inc.

The amount of the rubber type resin in the total binder is 0 to 70 wt. %, and preferably 5 to 50 wt. % based on the weight of the total binder.

Additives used in the second step of the present invention are dispersing agents, lubricating agents, stabilizing agents, abrasive agents and antistatic agents.

The dispersing agents include conventional dispersing agents for pigment and surface active agents such as a fatty acid having 12 to 18 carbon atoms ($R_1COOH$, wherein $R_1$ is an alkyl group having 11 to 17 carbon atoms) such as capric acid, caprylic acid, lauric acid, myristic acid, palmitic acid, stearic acid, oleic acid, elaidic acid, linolic acid, linolenic acid or stearolic acid; metal soap of alkali metal (Li, Na, K and the like) or alkaline earth metal (Mg, Ca, Ba) of the fatty acid; a fluorine-containing fatty acid; and amide of the fatty acid; an aliphatic amine; higher alcohols; polyalkylene oxide alkyl phosphate; alkyl phosphate, alkyl borate; sarcosinates; alkyl ether esters; trialkyl polyolefin oxyquaternary ammonium salt; and lecithin as described, for example, in U.S. Pat. Nos. 3,387,993 and 3,470,021.

These dispersing agents can be used in an amount of 0.1 to 10 parts by weight, preferably 0.5 to 5 parts by weight based on 100 parts by weight of the ferromagnetic particles.

The lubricating agents used in the present invention include known lubricating agents and lubricating agents for plastics such as the above described fatty acids; higher alcohols; fatty acid esters consisting of monobasic fatty acid having 12 to 20 carbon atoms such as butyl stearate or sorbitan oleate and monovalent or polyhydric alcohols having 3 to 20 carbon atoms; silicone oil such as dimethyl polysiloxane or methyl phenyl polysiloxane; fatty acid modified silicone compounds, fluoroalkyl polysiloxane; mineral oil; vegetable and animal oil; olefin low polymerization compounds; $\alpha$-olefin low polymerization compounds; graphite particles; molybdenum disulfide particles; or Teflon particles as described, for example, in U.S. Pat. Nos. 2,654,681, 3,470,021, 3,492,235, 3,497,411, 3,523,086, 3,625,760, 3,630,772, 3,634,253, 3,642,539, 3,687,725, 3,996,407, 4,007,313, 4,007,314, 4,018,967 and 4,018,968.

These lubricating agents are used in an amount of 0.1 to 10 parts by weight, preferably 0.5 to 5 parts by weight based on 100 parts by weight of the ferromagnetic particles.

The stabilizing agents are conventionally used stabilizing agents for plastics, ultraviolet preventing agents for plastics and antioxidizing agents for plastics such as organic tin compounds, e.g., dibutyl tin dilaurate; metal soap of alkaline earth metals of the fatty acid; epoxy compounds, e.g., epoxidated oil; organic phosphites; benzophenone compounds; benzotriazole compounds or phenol type antioxidizing agents.

These stabilizing agents are used in an amount of 0.1 to 10 wt. %, preferably 0.1 to 5 wt. % based on the weight of the ferromagnetic particles.

The abrasive agents are those generally used such as $\alpha$-alumina, silicone carbide, chromium oxide, corundum, artificial corundum, diamond, artificial diamond, garnet or emery (main components: corundum and magnetite) and the like. The abrasive agents have an average particle size of 0.05 to 5 $\mu$m, preferably 0.1 to 2 $\mu$m, and are used in an amount of 0.1 to 20 parts by weight, preferably 0.5 to 5 parts by weight based on 100 parts by weight of the ferromagnetic particles as described, for example, in U.S. Pat. Nos. 3,007,807, 3,167,378, 3,041,196, 3,293,066, 3,630,910, 3,687,725 and 4,015,042.

The antistatic agents are natural surface active agents such as carbon or saponin; nonionic surface active agents such as alkylene oxides, glycerol or glycidol; cationic surface active agents such as higher alkyl amines, quaternary ammonium salts, pyridine and other heterocyclic compounds, phosphoniums or sulfoniums; anionic surface active agents such as carboxylic acid, sulfonic acid, phosphoric acid or a compound having an acid group of sulfate group and phosphate group; and amphoteric surface active agents such as amino acids, amino sulfonic acids, sulfates or phosphates of amino alcohol as described, for example, in U.S. Pat. Nos. 2,240,472, 2,271,623, 2,288,226, 2,676,122, 2,676,924, 2,676,975, 2,691,566, 2,727,860, 3,158,484 and 3,442,659.

These antistatic agents are used in an amount of 0.1 to 10 wt. %, preferably 0.1 to 5 wt. %, based on the weight of the ferromagnetic particles.

These additives are not necessarily added during the second step, and can be added after the dispersion is terminated in the second step or in the third step. Abrasive agents or carbon can be added in the first step, if necessary.

Polyisocyanates used in the third step of the present invention are a reaction product of 1 mole of trimethylolpropane and 3 moles of diisocyanates such as tolylene diisocyanate, xylylene diisocyanate or hexamethylene diisocyanate, adduct products of 3 moles of hexamethylene diisocyanate and biuret, adduct compounds of 3 moles of tolylene diisocyanate, 2 moles of hexamethylene diisocyanate and isocyanurate, diphenylmethane diisocyanate polymer and isophorone diisocyanate.

These polyisocyanates are commercially available under the trade names of "Coronate L", "Coronate HL", "Coronate 2030", "Milionate MR" and "Milionate MTL" manufactured by Nippon Polyurethane Co., Ltd., "Desmodur L", "Desmodur N", "Desmodur IL" and "Desmodur HL" manufactured by Sumitomo Bayer Urethane Co., Ltd., "Takenate D-102", "Takenate D-110N" and "Takenate D-202" manufactured by Takeda Chemical Industries, Ltd.

The amount of the binder (total amount of copolymers of vinyl chloride, vinyl acetate and maleic anhydride, rubber type resins and polyisocyanates) of the present invention is preferably 10 to 100 parts, and most preferably 15 to 40 parts by weight based on 100 parts by weight of the ferromagnetic particles.

The solvents used in the first step through third step of the present invention are those which dissolve copolymers of vinyl chloride, vinyl acetate and maleic anhydride and rubber type resins and have a boiling point of 50° C. to 200° C., more preferably 80° C. to 160° C. When polyisocyanates are used in this invention, those polyisocyanates having no active hydrogen groups should be used.

The solvents are used alone or in combination. As long as the solvents used in combination can dissolve copolymers and the resins, some solvents which do not dissolve copolymers of vinyl chloride, vinyl acetate and maleic anhydride and rubber type resins alone can be used together.

The organic solvents include alcohols such as ethanol, n-propanol, isopropanol or n-butanol; ketones such as methyl ethyl ketone, methyl isobutyl ketone or cyclohexanone; acetic acid esters such as ethyl acetate or butyl acetate; and hydrocarbons such as toluene or xylene.

Other organic solvents such as cellosolves, chlorinated hydrocarbons, nitrated hydrocarbons or formamides can also be used.

In the first step of the present invention, a mixture of a solution of copolymers of vinyl chloride, vinyl acetate, maleic anhydride and ferromagnetic particles having a viscosity of about 100 poises or more is mixed and kneaded for about 0.5 to about 6 hours. Mixing and kneading are carried out by a known kneader such as an open kneader, a kneader used under pressure, a helical kneader, a continuous kneader, a three roll mill, a taper roll, an internal mixer or a Bambury's mixer.

Of these kneaders, an open kneader, a kneader used under pressure and a continuous kneader are most preferred.

Where the concentration of a solution of copolymers of vinyl chloride, vinyl acetate and maleic anhydride is not higher than 15 wt. %, the electromagnetic properties of the resulting magnetic recording medium cannot be improved, because it is believed that the mixture of the copolymers and ferromagnetic particles has a low viscosity and therefore is not completely mixed and kneaded.

Where the concentration of a solution of copolymers of vinyl chloride, vinyl acetate and maleic anhydride is about 50 wt. % or more, the electromagnetic properties of the medium cannot be improved.

Dispersing can be carried out in the second step for about 2 to about 48 hours by a dispersing device such as a ball mill, an attriter, a sand grinder or a vibrating mill. Of these dispersing devices, a ball mill and a sand grinder are the most preferred.

The viscosity of the dispersion is about 1 poise to 500 poises, preferably about 10 poises to 200 poises.

If the viscosity is less than about 1 poise and more than about 500 poises, the mixture of copolymers and ferromagnetic particles is not well dispersed and the electromagnetic properties of the resulting magnetic recording medium are not superior.

The mixing of the polyisocyanate can be carried out for about 10 to about 60 minutes.

The coating methods used in the present invention are disclosed in Japanese Patent Application (OPI) Nos. 108,804/77, 21,805/79 and 46,011/79. (The term "OPI" as used herein refers to a "published unexamined Japanese Patent Application".)

The present invention is illustrated in more detail by the following Examples and Comparative Examples, but should not be limited thereto.

In Examples and Comparative Examples, all "parts" are "parts by weight".

EXAMPLE 1 AND COMPARATIVE EXAMPLE 1

| | |
|---|---|
| $\gamma$-Fe$_2$O$_3$ (Hc 400 Oe, acicular ratio 10/1, average particle length 0.3$\mu$, specific surface area 22 m$^2$/g) | 100 parts |
| Butyl acetate solution of copolymers of vinyl chloride, vinyl acetate and maliec anhydride (86/13/1 wt. %) (trade name of "S-lec M" manufactured by Sekisui Chemical Co., Ltd.; polymerization degree 430) Concentration is shown in Table 1 | 18 parts (solid content) |

The above compositions were mixed and kneaded for 2 hours by an open kneader.

The mixture was put in a ball mill, the flollowing compositions were added thereto and were dispersed for 48 hours, and the dispersion was filtrated by a filter having an average pore diameter of 3$\mu$ to prepare a coating composition for a magnetic layer.

| | |
|---|---|
| 30 wt. % ethyl acetate solution of polyester polyurethane under the trade name of "Crisvon 7209" manufactured by Dai-Nippon Ink & Chemicals, Inc. (a reaction product of butylene adipate and tolylene diisocyanate, Number average molecular weight: 20,000) | 10 parts |
| Oleic acid | 2 parts |
| Silicone oil (polymerization degree about 60) | 0.5 parts |
| Butyl acetate | to make total solution 350 parts |

The thus obtained coating composition was coated by a reverse roll to have a dry thickness of 5$\mu$ on a polyethylene terephthalate film having a thickness of 7$\mu$. While the coating layer was undried, the layer was subjected to magnetic orientation using electromagnets having 1,000 gauss and was dried. After the layer was dried, it was subjected to super-calendering treatment with a roll to make the magnetic layer smooth, which was then slit to a width of 3.81 mm to prepare an audio cassette tape (Phillips type compact cassette tape).

The characteristics of thus obtained tape are shown in Sample Nos. 1 to 3 and in Comparative Sample No. C-1 of Table 1.

EXAMPLE 2

The same procedure as in Example 1 was repeated except that copolymers of vinyl chloride, vinyl acetate and maleic anhydride (81/17/2 wt. %), trade name of "VMCA" manufactured by Japan Union Carbide Co. (degree of polymerization: about 400) was used instead of copolymers of vinyl chloride, vinyl acetate and maleic anhydride (86/13/1 wt. %) of Example 1 to prepare an audio cassette tape.

The characteristics in the tape are shown in Sample No. 4 in Table 1.

COMPARATIVE EXAMPLE 2

The same procedure as in Example 1 was repeated except that copolymers of vinyl chloride and vinyl acetate (88/12 wt. %), trade name of "S-lec C" manufactured by Sekisui Chemical Co., Ltd. (degree of polymerization: about 400) was used instead of copolymer of vinyl chloride, vinyl acetate and maleic anhydride (86/13/1 wt. %) of Example 1 to prepare an audio cassette tape.

The characteristics of the tape are shown in Sample No. C-2 in Table 1.

COMPARATIVE EXAMPLE 3

In addition to ferromagnetic particles and the solution of copolymers of vinyl chloride, vinyl acetate and maleic anhydride of Example 1, a solution of polyurethane was added and they were mixed and kneaded by an open kneader.

The mixture was put in a ball mill and the same procedure as in Example 1 was repeated except that the polyurethane solution was not added in the ball mill to prepared an audio cassette tape.

The characteristics of the tape are shown in Sample No. C-3 in Table 1.

COMPARATIVE EXAMPLE 4

The same procedure as in Comparative Example 3 was repeated except that oleic acid and silicone oil were further added at the mixing and kneading step by an open kneader and that only butyl acetate was added the ball mill to prepare an audio cassette tape.

The characteristics of the tape are shown in Sample No. C-4 in Table 1.

COMPARATIVE EXAMPLE 5

All of ferromagnetic particles, binders, additives and solvents were put in a ball mill without mixing and kneading treatment of Example 1, and the same procedure as in Example 1 was repeated to prepare an audio cassette tape.

The characteristics of the tape are shown in Sample No. C-5 in Table 1.

COMPARATIVE EXAMPLE 6

| | |
|---|---|
| $\gamma$-Fe$_2$O$_3$ (same as those used in Example 1) | 100 parts |
| 30 wt. % butyl acetate solution of copolymers of vinyl chloride, vinyl acetate and maleic anhydride (same as those used in Example 1) | 60 parts |
| Butyl acetate | 177.5 parts |

The above compositions were put in a ball mill and dispersed for 24 hours, and the following compositions were added and dispersed for 24 hours to prepare a coating composition.

| | |
|---|---|
| 30% ethyl acetate solution of polyester polyurethane (same as that used in Example 1) | 10 parts |
| Oleic acid | 2 parts |
| Silicone oil (Polymerization degree about 60) | 0.5 part |

Then, the same procedure as in Example 1 was repeated to prepare an audio cassette tape.

The characteristic of the tape were shown in Sample No. C-6 of Table 1.

EXAMPLE 3 AND COMPARATIVE EXAMPLE 7

| | |
|---|---|
| Co-coated Bertholide iron oxide (Co 2.0 atomic % coating, FeO 1.4, Hc 660 Oe, Acicular ratio 10:1, average particle length 0.3 $\mu$m, specific surface area 30 m$^2$/g) | 100 parts |
| Butyl acetate solution of copolymer of vinyl chloride, vinyl acetate and maleic anhydride (same as those in Example 1) (Concentration is shown in Table 2) | 15 parts by solid content |

The above compositions were mixed and kneaded for 2 hours by an open kneader.

The mixture was put in a tank and the following compositions and butyl acetate were added thereto to make the total mixture 330 parts, mixed for 1 hour and dispersed by a sand grinder for 6 hours.

| | |
|---|---|
| 30 wt. % Ethyl acetate solution of polyester polyurethane (same as that of Example 1) | 30 parts |
| Oleic acid | 2 parts |
| Butyl stearate | 1 parts |
| $\alpha$-alumina (average particle diameter 0.3$\mu$) | 2 parts |
| Electroconductive carbon | 3 parts |

The dispersion was put in the tank and 8 parts of a polyisocyanate compound, trade name "Coronate L-75" manufactured by Nippon Polyurethane Co., Ltd., were added thereto. The mixture was stirred for 1 hour and was filtrated by a filter having an average pore diameter of 1$\mu$ to prepare a cotaing composition.

Thus obtained coating composition was coated to have a dry thickness of 5$\mu$ on a polyethylene terephthalate film having a thickness of 14$\mu$. While the film was undried, the coated layer was subjected to magnetic orientation with magnets of 3000 gauss and dried.

After drying, the layer was subjected to super-calendering treatment with a roll to make the surface of the magnetic layer smooth. The thus obtained bulk roll was subjected to heat treatment to completely harden the magnetic layer and was slit to a width of ½ inch to prepare a video cassette tape.

The characteristics of the tape are shown in Sample Nos. 5 to 7 and Comparative Sample No. C-7 in Table 2.

EXAMPLE 4

The same procedure as in Example 3 was repeated except that copolymers of vinyl chloride, vinyl acetate and maleic anhydride (81/17/2 wt. %), trade name of "VMCA" manufactured by Japan Union Carbide Co. (same as those used in Example 2) was used instead of copolymers of vinyl chloride, vinyl acetate and maleic anhydride (86/13/1 wt. %) of Example 3 to prepare a video cassette tape.

The characteristics of the tape are shown in Sample No. 8 in Table 2.

COMPARATIVE EXAMPLE 8

The same procedure as in Example 3 was repeated except that copolymers of vinyl chloride and vinyl acetate (88/12 wt. %), trade name of "S-lec C" manufactured by Sekisui Chemical Co., Ltd. (same as those used in Comparative Example 2) were used instead of copolymers of vinyl chloride, vinyl acetate and maleic anhydride (86/13/1 wt. %) of Example 3 to prepare a video cassette tape.

The characteristics of the tape are shown in Sample No. C-8 in Table 2.

COMPARATIVE EXAMPLE 9

The same procedure as in Example 3 was repeated except that a solution of polyester polyurethane was further added to the compositions at the mixing and kneading step by an open kneader and that a solution of polyester polyurethane was not added at the mixing step in the tank to prepare a video tape.

The characteristics of the tape are shown in Sample No. C-9 in Table 2.

COMPARATIVE EXAMPLE 10

The same procedure as in Comparatuve Example 9 was repeated except that oleic acid, butyl stearate and -alumina were further added at the mixing and kneading step by an open kneader and that only butyl acetate was added in the tank to prepare a video tape.

The characteristics of the tape are shown in Sample No. C-10 in Table 2.

COMPARATIVE EXAMPLE 11

The same procedure as in Example 3 was repeated except that mixing and kneading treatment of Example 3 was not carried out and that magnetic particles, a solution of vinyl chloride, vinyl acetate and maleic anhydride copolymers, a solution of polyester polyurethane, oleic acid, butyl stearate, α-alumina, and butyl acetate were mixed in the tank for 1 hour and then were dispersed by a sand grinder for 6 hours to prepare a video tape.

The characteristics of the tape are shown in Sample No. C-11 in Table 2.

TABLE 1-1

| | Sample No. | Copolymers of VC/VAC/MA VC/VAC/MA | Concentration (%) | Time of adding Ferromagnetic Particles | Copolymers of VC/VAC/MA | Polyurethane | Additives |
|---|---|---|---|---|---|---|---|
| Example 1 | 1 | 86/13/1 | 30 | a | a | b | b |
| | 2 | 86/13/1 | 20 | a | a | b | b |
| | 3 | 86/13/1 | 15 | a | a | b | b |
| Example 2 | 4 | 81/17/2 | 30 | a | a | b | b |
| Comparative Example 1 | C-1 | 86/13/1 | 10 | a | a | b | b |
| Comparative Example 2 | C-2 | 88/12/0 | 30 | a | a | b | b |
| Comparative Example 3 | C-3 | 86/13/1 | 30 | a | a | a | b |
| Comparative Example 4 | C-4 | 86/13/1 | 30 | a | a | a | a |
| Comparative Example 5 | C-5 | 86/13/1 | 30 | b | b | b | b |
| Comparative Example 6 | C-6 | 86/13/1 | 30 | b | b | c | c |

TABLE 1-2

| | Sample No. | MOL 315 (dB) | SOL 10K (dB) | Audio Running Properties | Level Decrease | Head Staining | Tape Squeal |
|---|---|---|---|---|---|---|---|
| Example 1 | 1 | 1.4 | 2.1 | A | A | A | A |
| | 2 | 1.0 | 1.4 | A | A | A | A |
| | 3 | 0.4 | 0.8 | A | A | A | A |
| Example 2 | 4 | 0.7 | 0.9 | A | A | A | A |
| Comparative Example 1 | C-1 | 0.1 | 0.5 | A | A | B | B |
| Comparative Example 2 | C-2 | 0.2 | 0.1 | B | B | B | A |
| Comparative Example 3 | C-3 | 0.5 | 0.4 | B | B | B | C |
| Comparative Example 4 | C-4 | 0.1 | 0.1 | B | B | B | B |
| Comparative Example 5 | C-5 | −0.3 | 0.4 | B | B | B | B |

TABLE 1-2-continued

| | Sample No. | MOL 315 (dB) | SOL 10K (dB) | Audio Running Properties | Level Decrease | Head Staining | Tape Squeal |
|---|---|---|---|---|---|---|---|
| Comparative Example 6 | C-6 | −0.3 | 0.5 | B | B | B | B |

TABLE 2-1

| | Sample No. | Copolymers of VC/VAC/MA | | | Time of adding | | |
|---|---|---|---|---|---|---|---|
| | | VC/VAC/MA | Concentration (%) | Ferromagnetic Particles | Copolymers of VC/VAC/MA | Poly-urethane | Additives |
| Example 3 | 5 | 86/13/1 | 30 | a | a | b | b |
| | 6 | 86/13/1 | 20 | a | a | b | b |
| | 7 | 86/13/1 | 15 | a | a | b | b |
| Example 4 | 8 | 81/17/2 | 30 | a | a | b | b |
| Comparative Example 7 | C-7 | 86/13/1 | 10 | a | a | b | b |
| Comparative Example 8 | C-8 | 88/12/0 | 30 | a | a | b | b |
| Comparative Example 9 | C-9 | 86/13/1 | 30 | a | a | a | b |
| Comparative Example 10 | C-10 | 86/13/1 | 30 | a | a | a | a |
| Comparative Example 11 | C-11 | 86/13/1 | 30 | b | b | b | b |

TABLE 2-2

| | Sample No. | Video Output (dB) | S/N Ratio (dB) | Video Running Properties | Increase of Drop Out | Still Life (min.) | Tape Squeal |
|---|---|---|---|---|---|---|---|
| Example 3 | 5 | 2.7 | 3.1 | A | A | 120 or more | A |
| | 6 | 1.9 | 2.2 | A | A | 120 or more | A |
| | 7 | 1.1 | 1.3 | A | A | 120 or more | A |
| Example 4 | 8 | 1.5 | 1.4 | A | A | 120 | A |
| Comparative Example 7 | C-7 | 0.7 | 0.4 | A | B | 80 | B |
| Comparative Example 8 | C-8 | 0.3 | 0.1 | B | B | 50 | A |
| Comparative Example 9 | C-9 | 0.4 | 0.3 | B | B | 40 | B |
| Comparative Example 10 | C-10 | −0.2 | −0.1 | B | B | 30 | B |
| Comparative Example 11 | C-11 | 0.3 | 0.4 | B | C | 40 | B |

Abbreviations used in Tables 1 and 2 are explained below.

VC: vinyl chloride
VAC: vinyl acetate
MA: maleic anhydride a: Time of addition when the composition is mixed and kneaded by an open kneader.
b: Time of addition when the composition begins to be mixed by a ball mill.
c: Time of addition after the composition is dispersed for 24 hours.
d: Time of addition when the dispersed composition is mixed in a tank.

Various characteristics of the tapes indicated in Tables 1 and 2 were evaluated by the following methods.

(a) MOL 315

The maximum output level at 315 Hz (distortion degree 3%) was measured with a cassette tape deck "582" manufactured by Nakamichi Co., Ltd. using "Fuji Cassette ERC-90" manufactured by Fuji Photo Film Co., Ltd. as a reference tape that was assumed to produce an output of 0 dB.

(b) SOL 10K

The saturated output level at 10 KHz was measured where a reference tape was assumed to deliver an output of 0 dB.

(c) Audio running properties

Tape running tests were conducted using 100 commercial cassette tape decks at 25° C. and 50% RH and at 40° C. and 80% RH to see how orderly the tape samples could be wound and the results were evaluated on a four-grade basis.

A . . . could be orderly wound.
B . . . could not be orderly wound on 1 to 5 decks.
C . . . could not be orderly wound on 5 to 10 decks.
D . . . could not be orderly wound on 11 decks or more.

(d) Level decrease

Decrease of output level at 10 KHz was evaluated at the same time with the tape running tests.

A . . . less than 3 dB.
B . . . less than 6 dB.
C . . . less than 9 dB.
D . . . 9 dB or more.

(e) Head staining

After evaluation of the tape running properties, the head of each deck was checked for the presence of stain and the results were evaluated on a three-grade basis.

A . . . Stain was absent or hardly detectable.
B . . . Some stain but negligible stain.
C . . . Considerable stain.

(f) Tape squeal

The presence of any tape squeal was also checked during the tape running tests.

A... No tape squeal was heard.
B... Occasional squeals were heard on 1 to 2 cassette tapes.
C... Occasional squeals were heard on 3 to 5 cassette tapes.
D... Occasional squeals were heard on 5 or more cassette tapes and continuous squeals were heard on 2 or more cassette tapes.

(g) Video output

The output at 4 MHz was measured using "NV-6600" manufactured by Matsushita Electric Industries Co., Ltd. using a Super ST, T-120 tape manufactured by Fuji Photo Film Co., Ltd. as a reference tape that was assumed to deliver an output of dB.

(h) S/N ratio

The S/N ratio at 10K to 4 MHz after visibility correction was measured with "NV-6600" manufactured by Matsushita Electric Industries Co., Ltd.

(i) Video running properties

Video tape running tests were conducted with 50 commercial VHS video tape decks to see if any jitter or skew occurred at 25° C. and 50% RH and at 40° C. and 80% RH.

A... No jitter or skew
B... Some but insignificant jittering or skewing
C... Frequent jittering or skewing caused a problem.

(j) Increase of Dropout

Increase of dropout was measured at the same time with video tape running tests.

A... Increase of less than 10 per min.
B... Increase of less than 20 per min.
C... Increase of less than 30 per min.
D... Increase of 30 or more per min.

(k) Still life

The time (min) for a serious defect to occur in a picture reproduced in a still mode was measured using "NV-6600" manufactured by Matsushita Electric Industries Co., Ltd.

(1) Tape squeal

The same as the tape squeal (f).

It is apparent from a comparison between Sample No. 1 and Sample No. C-5 and C-6 in Table 1 that an audio tape having better electromagnetic properties and running properties and durability can be obtained by mixing and kneading a highly concentrated solution of copolymers of vinyl chloride, vinyl acetate and maleic anhydride.

It is understood from Sample Nos. 1 to 3 and Sample No. C-1 that the electromagnetic properties, running properties and durability are not improved when a low concentrated solution of copolymers of vinyl chloride, vinyl acetate and maleic anhydride is used at the mixing and kneading steps.

It is clear from Sample No. 1 and No. 4 and Sample No. C-2 that the effect of the present invention of the mixing and kneading treatment becomes more remarkable as the ratio of maleic anhydride in copolymers of vinyl chloride, vinyl acetate and maleic anhydride becomes higher.

It is understood from Sample No. 1, Sample No. C-3 and C-4 that the effect of the mixing and kneading treatment of the present invention can not be obtained when a rubber type resin and additives are added at the improper time.

The same understanding with that of Table 1 is obtained from Table 2.

It is apparent from the results in Tables 1 and 2 that a magnetic recording medium having excellent electromagnetic properties, running properties and durability can be obtained by mixing and kneading ferromagnetic particles and a highly concetrated solution of copolymers of vinyl chloride, vinyl acetate and maleic anhydride, particularly having high amount of maleic anhydride.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support having coated thereon a magnetic layer which is prepared by mixing a solution consisting essentially of copolymers of vinyl chloride, vinyl acetate and maleic anhydride having 0.1 to 10 wt. % of maleic anhydride, a degree of polymerization of 200 to 600 and a molecular weight distribution (MW/MN) of 1.0 to 3.0, the concentration of the solution being 20 to 50 wt. %, with ferromagnetic particles and kneading them in a first step, then adding a solution of rubber type resins and additives thereto and dispersing them to prepare a coating composition in a second step.

2. A magnetic recording medium comprising a non-magnetic support having coated thereon a magnetic layer which is prepared by mixing a solution consisting essentially of copolymers of vinyl chloride, vinyl acetate and maleic anhydride having 0.1 to 10 wt. % of maleic anhydride, a degree of polymerization of 200 to 600 and a molecular weight distribution (MW/MN) of 1.0 to 3.0, the concentration of the solution being 20 to 50 wt. %, with ferromagnetic particles and kneading them in a first step, then adding a solution of rubber type resins and additives thereto and dispersing them in a second step, and mixing polyisocyanate compounds therewith in a third step to prepare a coating composition.

3. The magnetic recording medium as claimed in claim 1, wherein the ratio of maleic anhydride in the copolymers of vinyl chloride, vinyl acetate and maleic anhydride is 0.5 to 5 wt. %.

4. The magnetic recording medium as claimed in claim 2, wherein the ratio of maleic anhydride in the copolymers of vinyl chloride, vinyl acetate and maleic anhydride is 0.5 to 5 wt. %.

5. The magnetic recording medium as claimed in claim 1, wherein rubber type resins are polyester polyurethanes.

6. The magnetic recording medium as claimed in claim 2, wherein rubber type resins are polyester polyurethanes.

7. A process for preparing a magnetic recording medium which comprises mixing 20 to 50 wt. % solution consisting essentially of copolymers of vinyl chloride, vinyl acetate and maleic anhydride having 0.1 to 10 wt. % of maleic anhydride, a degree of polymerization of 200 to 600 and a molecular weight distribution (MW/MN) OF 1.0 TO 3.0 with ferromagnetic particles and kneading them in a first step, then adding a solution of rubber type resins and additives thereto and dispersing them in a second step to prepare a coating composition and coating it on a non-magnetic support.

8. A process for preparing a magnetic recording medium which comprises mixing a 20 to 50 wt. % solution consisting essentially of copolymers of vinyl chloride, vinyl acetate and maleic anhydride having 0.1 to 10 wt. % of maleic anhydride, a degree of polymerization of 200 to 600 and a molecular weight distribution (MW/MN) of 1.0 to 3.0 with ferromagnetic particles and kneading them in a first step, then adding a solution of rubber types resins and additives thereto and dispersing them in a second step, and mixing polyisocyanate compounds therewith in a third step to prepare a coating composition and coating it on a non-magnetic support.

9. The magnetic recording medium as claimed in claim 1, wherein the amount of maleic anhydride in the copolymers of vinyl chloride, vinyl acetate and maleic anhydride is 1 to 3 wt. %.

10. The magnetic recording medium as claimed in claim 2, wherein the amount of maleic anhydride in the copolymers of vinyl chloride, vinyl acetate and maleic anhydride is 1 to 3 wt. %.

11. The magnetic recording medium as claimed in claim 1, wherein the degree of polymerization is 300 to 500.

12. The magnetic recording medium as claimed in claim 2, wherein the degree of polymerization is 300 to 500.

13. The magnetic recording medium as claimed in claim 1, wherein the copolymer of vinyl chloride, vinyl acetate and maleic anhydride has a concentration of 30 to 50 wt. %.

14. The magnetic recording medium as claimed in claim 2, wherein the copolymer of vinyl chloride, vinyl acetate and maleic anhydride has a concentration of 30 to 50 wt. %.

15. The magnetic recording medium as claimed in claim 1, wherein the amount of vinyl chloride is 70–99 wt. % and the amount of vinyl acetate is 0.5 to 20 wt. %.

16. The magnetic recording medium as claimed in claim 2, wherein the amount of vinyl chloride is 70–99 wt. % and the amount of vinyl acetate is 0.5 to 20 wt. %.

17. The magnetic recording medium as claimed in claim 1, wherein said rubber type resins are selected from the group consisting of a polyurethane resin, a styrene butadiene rubber, a butadiene rubber, an isoprene rubber, a chloroprene rubber, an isobutylene, an isoprene rubber, an acryloitrile butadiene rubber, a chlorinated butyl rubber, an acryl rubber and an epichlorohydrin rubber.

18. The magnetic recording medium as claimed in claim 2, wherein said rubber type resins are selected from the group consisting of a polyurethane resin, a styrene butadiene rubber, a butadiene rubber, an isoprene rubber, a chloroprene rubber, an isobutylene, an isoprene rubber, an acryloitrile butadiene rubber, a chlorinated butyl rubber, an acryl rubber and an epichlorohydrin rubber.

19. The magnetic recording medium as claimed in claim 1, wherein said additives include dispersing agents, lubricating agents, stabilizing agents, adhesive agents and antistatic agents.

20. The magnetic recording medium as claimed in claim 2, wherein said additives include dispersing agents, lubricating agents, stabilizing agents, adhesive agents and antistatic agents.

21. The magnetic recording medium as claimed in claim 2, wherein said polyisocyanate compounds are a reaction product of one mole of trimethylol propane and 3 moles of diisocyanates, adduct products of 3 moles of hexamethylene diisocyanate and biuret, adduct compounds of 3 moles of tolylene diisocyanate, 2 moles of hexamethylene diisocyanate and isocyanurate, diphenyl methane diisocyanate polymer and isophorone diisocyanate.

* * * * *